United States Patent [19]

Grant et al.

[11] Patent Number: 4,578,574
[45] Date of Patent: Mar. 25, 1986

[54] PATTERN TRACER WITH VARIABLE EFFECTIVE FORWARD OFFSET AND METHOD

[75] Inventors: John W. Grant, River Forest; Francis E. Ferrari, LaGrange Park, both of Ill.

[73] Assignee: Stewart-Warner Corporation, Chicago, Ill.

[21] Appl. No.: 428,577

[22] Filed: Sep. 30, 1982

[51] Int. Cl.$^4$ .............................................. G05B 1/00
[52] U.S. Cl. ................................... 250/202; 318/577
[58] Field of Search ........................ 250/202; 364/520; 318/577

[56] References Cited

U.S. PATENT DOCUMENTS

| | | | |
|---|---|---|---|
| 4,117,324 | 9/1978 | Francke | 250/202 |
| 4,396,832 | 8/1983 | Henderson | 250/202 |
| 4,441,020 | 4/1984 | Sakamoto et al. | 250/202 |
| 4,453,084 | 6/1984 | Brouwer | 250/202 |

Primary Examiner—Edward P. Westin
Attorney, Agent, or Firm—A. G. Douvas

[57] ABSTRACT

A pattern tracer and method of tracing in which the movement of a racing element along a pattern is controlled in accordance with an effective forward offset which is selectively less than the actual forward offset to optimize the tracing for speeds less than the maximum tracer speed. The effective forward offset is established by providing control angles which are based on the pattern angles as detected in accordance with a selected criterion depending upon the type of pattern curve detected. The control angles are either calculated from the detected pattern angles or are selected from previously stored pattern angles. A kerf setting for lateral offset of the tracing element from the pattern is partially defined by the actual forward offset, so that changes in the effective forward offset do not cause any corresponding changes to the lateral offset or require changes to the kerf setting.

52 Claims, 22 Drawing Figures

REVOLUTION CLOCK

OUTPUT VIDEO

QUADRANT SELECTOR

PATH OF POINT O USING OFFSET R

TRACER ELEMENT O

POINT O @ t=0

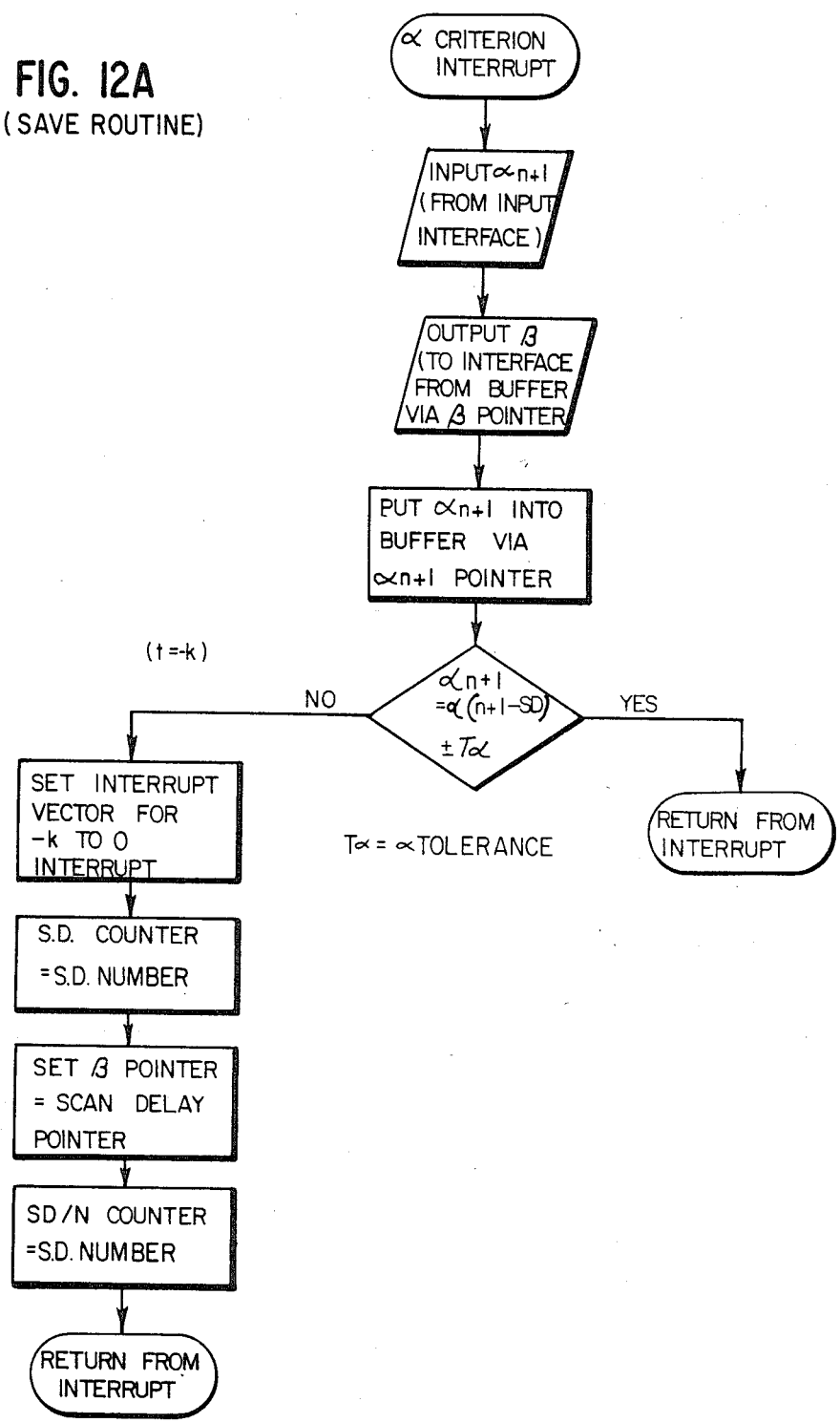

(SAVE ROUTINE)

(SAVE ROUTINE)

$T_\beta$ = BETA TOLERANCE

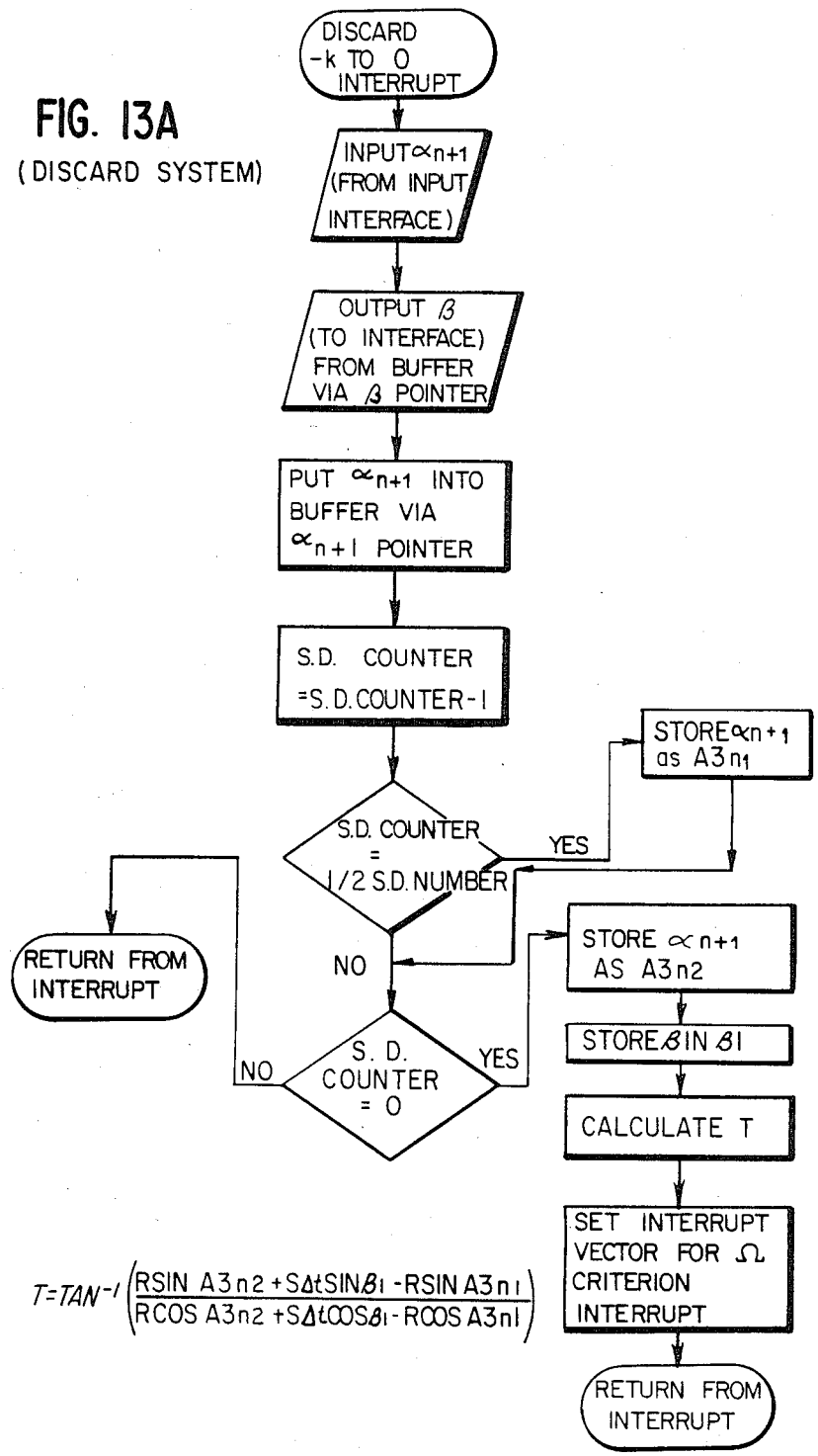

(DISCARD SYSTEM)

(CONTINUATION OF FIG. 13B)

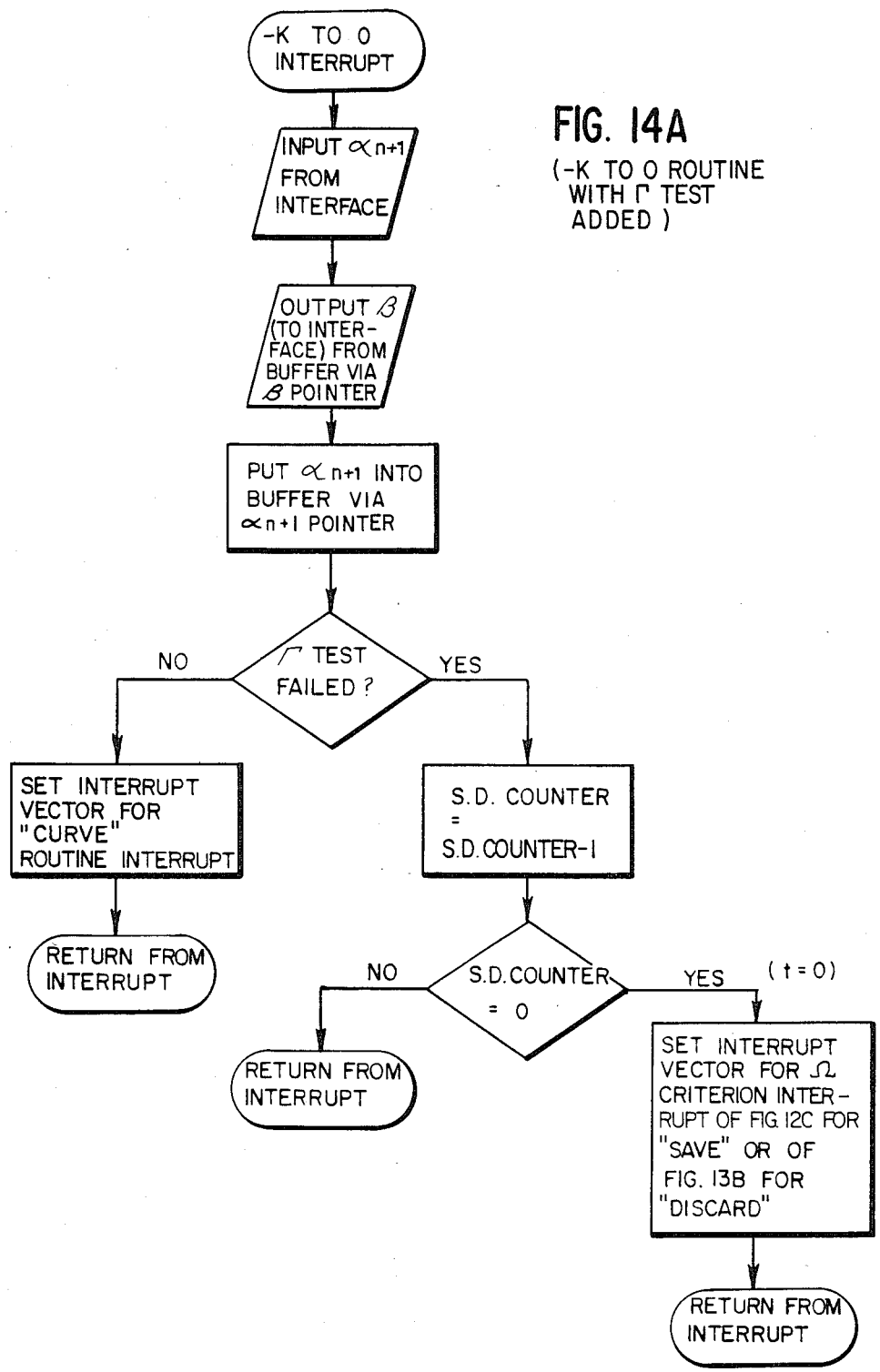

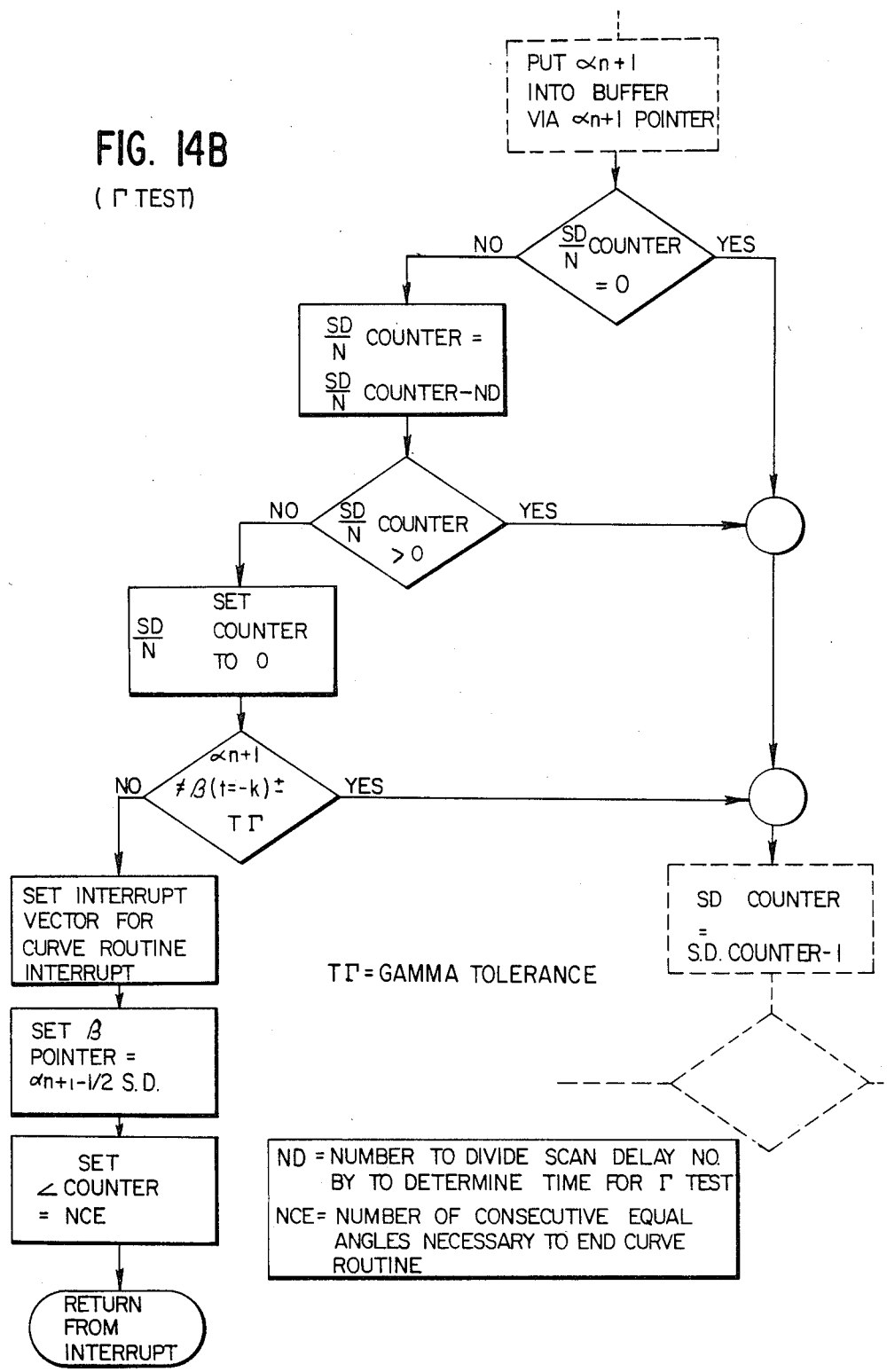

(CURVE ROUTINE)

PATTERN TRACER WITH VARIABLE EFFECTIVE FORWARD OFFSET AND METHOD

BACKGROUND OF THE INVENTION

This invention relates to pattern tracers and, more particularly, to pattern tracers of the type which have means for varying the forward offset of the pattern sensing element for different tracer speeds and means for selectively varying the lateral offset of a tracing element with respect to the pattern for different kerfs, or cutting thicknesses associated with different cutting tools.

Pattern tracers are well known, and reference may be made to the numerous patents issued in this field for background information. Examples of such patents include U.S. Pat. Nos. 2,499,178 of Berry et al; 2,868,993 of Henry; 2,933,668 of Brouwer; 3,017,552 of Brouwer; 3,209,152 of Brouwer; 3,366,857 of Jewell et al.; 3,386,786 of Kaisler et al.; 3,479,513 of Simpson et al.; 3,534,162 of Hannappel et al.; 3,544,221 of Putnam; 3,624,574 of Montagu; 3,704,372 of Parker et al.; 3,704,373 of Bardwell et al.; 3,711,717 of Rich et al.; 3,717,332 of Luker et al.; 3,725,761 of Webber; 3,727,120 of Jewell et al.; 3,767,923 of Bardwell; 3,812,412 of Hahn et al.; 3,860,862 of Dell et al.; 3,883,735 of Murphy et al.; 3,902,783 of Bodlaj; 3,920,316 of Daguillon; 3,932,743 of Sitnichenko et al.; 3,946,166 of Wossidlo; 3,959,673 of Montagu; 3,995,154 of Schlick et al.; 4,002,900 of Sitnichenko et al.; 4,011,003 of Dragt; 4,021,096 of Dragt; 4,039,246 of Voigt; 4,049,962 of Kallen; 4,063,287 of van Rosmalen; 4,073,567 of Lakerveld et al.; 4,081,671 of Bohme et al.; 4,090,112 of Selverstone; 4,100,576 of Ditthardt; 4,123,146 of Dragt; 4,128,297 of Bourne; 4,128,481 of Schreyer; 4,129,814 of Francke; and 4,135,119 of Brosens.

Briefly, such tracers are provided with an optical sensor for photometrically detecting the pattern being traced and means for controlling the movement of a tracing element to follow the pattern in accordance with pattern detection signals generated by the sensor. Typically, the movement of a tool, such as a cutting torch, is controlled in accordance with the movement of the tracing element. Due to different kerfs, i.e. different thickness dimensions of the cut made by the cutting tool, such tracers are designed to follow the pattern at selected lateral offsets from the pattern, equal to half of the kerf of the tool being controlled.

One of the problems encountered in tracing a pattern is due to momentum. This problem is encountered whenever it is attempted to change the direction of the tracing element to follow a sharp, or small radius, turn in the pattern. These are the same forces which require a driver of an automobile to proceed slower around a sharp turn than when on a straight-away or gradual turn. Unfortunately, in many applications the pattern must be traced at a constant speed over the entire pattern path length including any sharp turns in the pattern. Theoretically, in order for the velocity to remain constant, the acceleration must approach infinity as the pattern turn becomes sharper, i.e., as the turn radius approaches zero.

Accordingly, in a real system where the force available to provide acceleration is limited, a certain degree of deviation from a given pattern path must be permitted. If a driver of an automobile enters a sharp turn in the road at a speed in excess of that at which the frictional forces of the tires can overcome the momentum of the automobile forcing it to go straight, then the automobile will miss the turn, and control of the automobile will be lost. Likewise, a tracing element will miss a turn in the pattern, if for a given velocity and a given pattern turn radius, the momentum cannot be overcome by the driving force controlling the movemennt of the tracer.

The phenomenon is illustrated in FIG. 1 of the accompanying drawings, in which a tracing element is being controlled to trace a pattern, such as a line pattern, from a point A to a pattern turn at point C and then to another point D. Because of the sharpness of the turn at point C, momentum will cause the tracing element to overshoot the turn and deviate from the pattern, as shown by the broken-line tracing path adjacent to point C. If the overshoot is extensive, the tracing element may be caused to continue off the pattern rather than ultimately return, as illustrated.

It is necessary for a driver to anticipate a sharp turn and to begin "cutting" the corner on the inside of the turn if his speed is too high in order to stay on the road and avoid missing the turn. Likewise, in pattern tracers, it is necessary to anticipate a sharp turn in the pattern and deviate from the pattern path. In known pattern tracers this anticipation has been achieved through use of a sensor which is offset forward of the tracing element, or reference point 0, to sense a change in pattern direction, or pattern turn, before that turn is reached by the tracing element. This forward offset is illustrated in FIG. 2 of the accompanying drawings in which the tracer is provided with a sensor that detects the pattern line ACD around the perimeter of an offset circle having an actual offset radius R from the tracing element O.

Once the pattern turn is detected, then the appropriate control, or drive, forces are applied to the tracing element to cause it to begin turning before the pattern turn is actually reached by the tracing element. The tracing element thus follows a path, shown in broken line (FIG. 3), deviating from the pattern path and "cutting the corner" or "rounding" the turn at point C. The turn of the tracing element begins when it is located at a distance from the turn at point C equal to the forward offset radius distance R which is when the pattern turn is first detected.

The amount of offset that is required to achieve the closest tracing of the pattern while avoiding overshoot is a function of both the speed of the tracing element and the maximum force available in the tracing element driving system. As the driving system becomes weaker, the the degree of offset required must become greater. Likewise, for a given driving system, if the tracer speed is increased, then the degree of offset required must also increase.

As the offset becomes greater, the deviation of the tracer path from the pattern becomes larger, and the turns of the tracer path become more rounded. Thus, it is desirable to avoid an offset greater than that which is needed to avoid overshoot.

In commercial practice, the balance of cost, driver power and permitted deviation is determined by the user and supplier of the tracing equipment. However, regardless of this balance, the forward offset required for the maximum speed of the tracing element is, of course, greater than that needed for speeds of the tracing element which are less than the maximum speed. A forward offset greater than needed will result in a greater deviation than necessary and a poorer quality tracing than could otherwise be obtained.

Consequently, a need exists to vary the offset for different tracer speeds. Known techniques for varying the forward offset as a function of tracer speed have been based on physical alteration of a sensor sytem. One tracer system is known which requires changing the magnification lenses for the sensor, so that it perceives a greater or lesser portion of the pattern in front of the tracing element. Another known tracing system requires changing the position of the sensor relative to the tracing element. In yet another system, a rotating mirror is used to direct the light from the pattern to the sensor, and the angle of the mirror is altered in response to centrifugal or electrical forces related to tracer speed to change the offset. These techniques unfortunately require a mechanical alteration of the sensing system each time a different speed is selected. All except the last technique discussed above, also unfortunately require the operator to physically interchange or move different parts of the sensing system for different speeds.

One other system is known which automatically varies the actual forward offset of a mechanically rotatable sensor with changes in tracer speed. In this system, a plurality of different sensor elements are provided in a sensor head which periodically, mechanically scans the pattern. The different sensing elements are associated with different forward offsets and are selected in accordance with the tracer speed. The necessary rotary scanning control for the sensor, however, significantly adds to the cost of this system.

Another problem with known tracers is that adjustment to the actual forward offset requires change to the kerf or lateral offset adjustment in order to maintain the same lateral offset kerf. This is due to the fact that in these sensors the lateral offset for a given kerf setting is partially based on the actual forward offset of the pattern sensor.

SUMMARY OF THE INVENTION

The principal objective of the present invention is to provide a pattern tracer and method of tracing a pattern which do not require physical alteration of a sensing system or mechanical scanning devices to achieve variation of an effective forward offset and which do provide a higher degree of control of the tracing element and facilitate adjustment of kerf for different tracer speeds.

More particularly, an object of this invention is provide a method of tracing a pattern with a tracing element and apparatus for achieving this method in which a pattern is detected by a sensor having a sensing element forwardly offset from the tracing element, and an effective forward offset is established that is different from the actual forward offset, and in which the movement of the tracing element is controlled in accordance with the effective forward offset.

A further important object of the present invention is to provide a method of tracing a pattern with a tracing element and to provide an apparatus for performing this method in which a kerf for the tracing element movement is based on the actual forward offset of a pattern sensor and in which an effective forward offset is established that is different from the actual forward offset, and the tracing element is controlled in accordance with this effective forward offset. In the preferred embodiment, this enables adjustment of speed and effective forward offset without resultant alteration of a previously set kerf.

Yet another objective is to provide a method of tracing a pattern with a tracing element and an apparatus for achieving this method in which a pattern is detected by a sensor, detected pattern information from the sensor is stored and the movement of the sensor along the pattern is controlled in accordance with the stored information. In the preferred embodiment, the sensor has a reference point, or tracing element, and means for detecting the pattern at locations spaced from the reference point by a pre-selected actual forward offset and the controlling means establishes an effective forward offset which is based on the detected pattern but is different from the actual forward offset. The controlling means also includes means responsive to the speed of the movement of the sensor for establishing the effective forward offset.

Still another object is to provide a method of tracing a pattern with a tracing element and an apparatus for achieving this method in which the pattern direction is first photometrically detected; then the detected pattern direction is stored during a first time period, and the movement of the tracing element is controlled during a second time period subsequent to the first time period in accordance with the information stored during the first time period. The second time period is sufficiently subsequent to said first period to cause the stored direction information to be significantly different from the pattern direction being detected during the second period.

Yet a further objective is to provide a method of tracing a pattern with a tracing element and an apparatus for achieving this method in which the pattern direction spaced in front of a tracing element by an actual forward offset distance is photometrically detected and the time when the pattern direction changes is determined; thereafter a control angle representative of the pattern direction detected immediately prior to detection of the change in direction is generated, and the movement of the tracer element is controlled in accordance with the generated control angle until the tracer has moved to an effective forward offset distance from the change in pattern direction. In a preferred embodiment, other control angles based on the pattern direction detected immediately after detection of the change in direction are generated, and the tracing element movement is controlled in accordance with these other control angles after the tracing element has moved within the effective forward offset distance from the change in pattern direction.

Still, a further object of the present invention is to provide a method and apparatus for implementing the method of tracing a pattern with a tracing element in which a control angle based on detected pattern information is electronically determined and then the movement of the tracing element is controlled in accordance with the control angle.

One more object of the invention is to provide a method of tracing a pattern with a tracing element and an apparatus for obtaining this method in which a pattern is detected by a sensor with an actual forward offset, one type of pattern turn is distinguished from another type of pattern turn, and the movement of the tracing element is controlled in accordance with the type of pattern turn detected. In the preferred embodiment, a criterion is established and successive pattern angle changes are compared to the criterion to distinguish one type of pattern turn from another.

Advantageously, the foregoing methods and apparatus eliminate the problems inherent in mechanical sensing systems used in known tracers and provide a greater degree of control and flexibility than has been previously achieved.

BRIEF DESCRIPTION OF THE DRAWINGS

The foregoing objects, features and advantages will be described in greater detail and further objects, features and advantages will be made apparent from a reading of the following detailed description of the preferred embodiment which is given with reference to the several views of the drawings, in which:

FIGS. 12A, 12B and 12C comprise an algorithm for operation of the Control Angle Generator of FIGS. 4 and 10 of one embodiment of the pattern tracer which employs a technique referred to herein as the "save" technique; and FIGS. 13A, 13B and 13C comprise an algorithm for operation of the control angle generator of FIGS. 4 and 10 of another embodiment of the pattern tracer which employs a technique referred to as the "discard" technique; and FIGS. 14A, 14B and 14C comprise an algorithm for operation of the Control Angle Generator of FIGS. 4 and 10 for either the save or the discard techniques in which the movement of the tracing element is controlled differently depending on different types of detected pattern turns.

DETAILED DESCRIPTION

Figure 4:
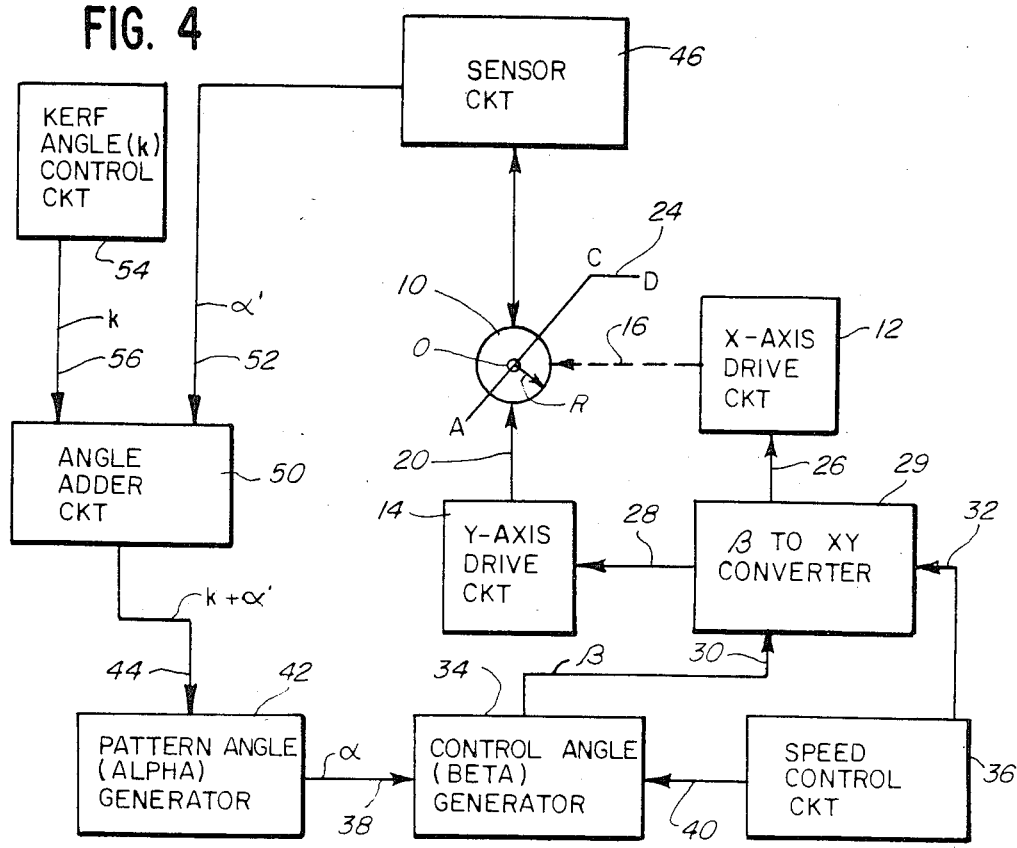
FIG. 4 is a functional block diagram of the pattern tracer of the present invention.
Figure 5:
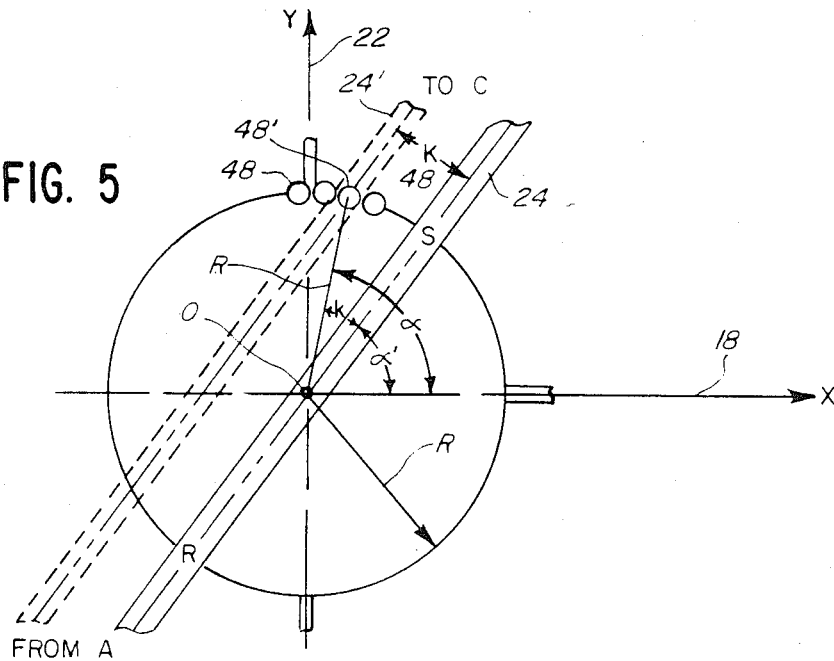
FIG. 5 is a schematic illustration of a circular sensor employed in the present invention and illustrating its relationship with a pattern line and the manner in which the lateral offset of the tracing element is defined.

Referring now to the drawings, particularly FIG. 4, a preferred embodiment of the variable forward offset tracer of the present invention is seen to have a circular sensor 10 with an actual forward offset R with respect to a tracing element, or reference point, O. The physical movement of the sensor 10 and tracing element O is accomplished by means including an X-axis Drive Circuit 12 and a Y-axis Drive Circuit 14. The X-axis Drive Circuit is coupled to the sensor 10 by a suitable mechanical drive linkage 16 which causes it to move along a sensor X-axis 18, as best seen in FIG. 5. The X-axis 18 passes through the tracing element O. Likewise, the Y-axis Drive Circuit 14 is coupled through a mechanical linkage 20 to selectively move the sensor 10 along a sensor Y-axis 22 which is perpendicular to X-axis 18, as seen in FIG. 5. Since Y-axis 22 also passes through tracing element O, an orthogonal coordinate system is defined with its origin at tracing element O.

By coordinating the drive applied in the X direction with the drive applied in the Y direction, the tracing element O is caused to move in any selected direction, such as the direction of a pattern 24. The X-axis Drive Circuit 12 and the Y-axis Drive Circuit 14 respond to control signals applied to their respective inputs 26 and 28. These control signals determine the drive speed of the individual drive circuits and determine both the direction and speed of movement of the sensor 10 and tracing element O.

The X and Y drive signals applied to the drive circuit inputs 26 and 28 are developed by a Beta to XY Converter 29 from a control angle, or beta angle, signal applied to its inputs 30, and a speed control signal applied to its input 32. The control angle signal is provided by a Control Angle (Beta) Generator 34. The speed control signal is provided by a Speed Control Circuit 36.

The control angle signal is representative of a desired directional angle of movement for the sensor and the Beta to XY Converter 29 translates this angle into the appropriate X and Y components of movement. The Speed Control Circuit 36, on the other hand, detects the speed selected by an operator or otherwise established and provides a signal representative of that speed between a maximum and minimum speed of the tracer.

As will be described in greater detail hereafter, the Control Angle Generator 34 produces the control angle beta, or B, in accordance with pattern angle alpha, or A, produced by Pattern Angle (Alpha) Generator 42. Pattern Angle Generator 42 produces the pattern angle alpha based on pattern angle information in the form of electrical signals applied to its input 44. This pattern angle information at input 44 is obtained from an Angle Adder Circuit 50. Angle Adder Circuit 50, in turn, receives pattern angle information alpha prime, or A'; at an input 52 from Sensor Circuit 46 and kerf angle information k at an input 56 from a Kerf Angle (k) Control Circuit 54. These two angles are added to produce the pattern angle alpha applied to input 44 and produced in appropriate form by Pattern Angle Generator 42.

The Kerf Angle Control Circuit 54 provides a kerf angle k selected by an operator to establish a selected kerf setting, or lateral offset K, equal to half of the kerf of the cutting tool being controlled, as shown in FIG. 5. In the absence of any kerf (i.e. K=0=k), the tracing element O is caused to follow a path in a position directly overlying the pattern 24'. However, since the cutting tool being controlled by the movement of the tracing element cuts away a portion of the work piece equal to the kerf, it is necessary to trace the pattern with the tracing element moving parallel to the pattern but spaced from the pattern line by a distance K equal to half the kerf. If this is not done, the inside dimension of the piece obtained from cutting the pattern will be undersized due to the tool cutting into the pattern by half the thickness of the tool.

The kerf is naturally defined with a radial coordinate system having a selected angular coordinate k and a distance coordinate R, which is equal to the actual forward offset R of the sensor 10. This defines the particular sensing element, such as sensing element 48 in FIG. 5, that will overlie the pattern 24' during the tracing movement. With the kerf angle equal to some non-zero value k, the tracing element O will trace an apparent pattern line 24 at a distance K from the actual pattern line 24', as shown in FIG. 5.

As will be explained, the movement of the sensor 10 and tracing element O is determined by a control angle beta which is based on the pattern angle alpha. Referring to FIG. 5, the pattern angle alpha is seen to comprise the sum of pattern angle alpha prime detected by sensor 10 and the kerf angle k. The tracer is designed to follow the pattern 24' with the tracing element O overlying the apparent pattern line 24. When the kerf angle is zero, the angle alpha equals the angle alpha prime and the apparent pattern line 24 coincides with the actual pattern line 24'. When the kerf angle takes some non-zero value, then the pattern angles (K+A') produced by Angle Adder Circuit 50 and the Pattern Angle Generator 42 are the same angles which would be produced if the kerf angle were zero but the actual pattern 24' were located offset therefrom where apparent pattern 24 is located.

As will be described in greater detail, the effective forward offset of the sensor may be changed in accordance with the present invention without changing the actual offset R. Unlike most known systems in which the effective forward offset is always equal to the actual forward offset, a change to the effective forward offset in the present invention does not require any adjustment to the kerf setting to maintain the same kerf offset K. Specifically, in prior devices in which the effective forward offset was by necessity equal to the actual forward offset, any change in the effective forward offset required a corresponding change to the kerf angle k in order to maintain the same kerf offset K. As can be appreciated from an examination of FIG. 5, for a given kerf angle k, the kerf offset K will vary proportionately with changes in R, the actual offset. Advantageously, in the present invention the effective forward offset and kerf adjustments are independent of one another.

The Sensor Circuit 46 controls the operation of the sensor 10. The Sensor Circuit 46 also receives pattern information from the sensor 10 and converts it to a signal representative of the angle alpha prime of the pattern relative to the XY coordinate system, as detected. In this regard, reference to production or detection of angles herein should be understood as a short hand reference to production or detection of one or more signals representing those angles.

Figure 1:
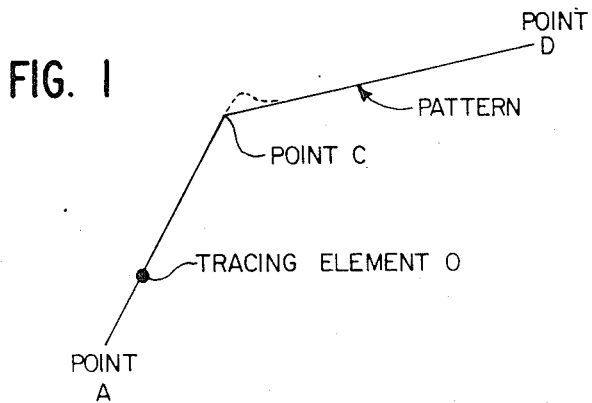
FIG. 1 is a view of a typical pattern illustrating the overshoot resulting from an inadequate forward offset and referred to in the foregoing background.
Figure 2:
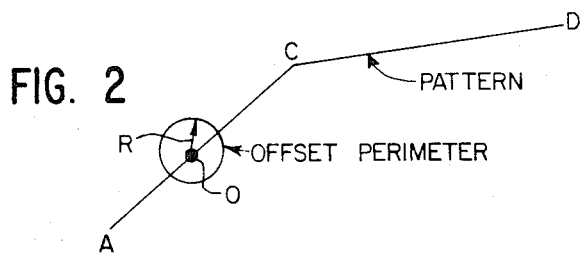
FIG. 2 is another pattern illustrating the forward offset of a tracer and referred to in the foregoing background.

Referring to FIG. 5, the Sensor Circuit 46 produces electrical signals based on the geometry of the sensor 10, i.e. the forward offset R, and the pattern 24', as detected by the sensor 10. In this instance, the segment of the pattern shown is a segment of the pattern of FIGS. 1-3 between points A and C. The sensor is a photometric sensor having a plurality of sensor elements 48, such as sixty-four sensor elements, located around a circular periphery.

Figure 6A:
FIGS. 6A, 6B and 6C are typical waveforms generated by the pattern tracer of FIG. 4 developed in response to the detected pattern, as shown in FIG. 5.
Figure 6B:
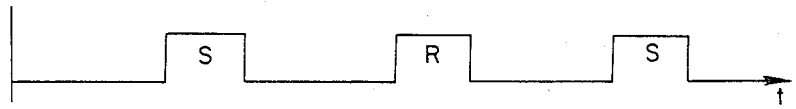
Figure 6C:
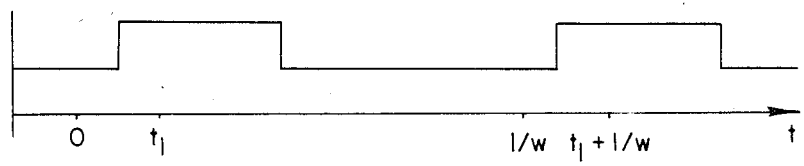

This plurality of sensor elements are periodically, successively scanned at a frequency determined by a revolution clock signal, shown in FIG. 6A. Each time a complete revolution is made around the periphery of the sensor 10, a new angle alpha prime is detected and corresponding signals generated. In particular, when the pattern is detected at a particular location, such as positions S and R, an output video signal pulse is generated, as shown in FIG. 6B. A reverse-forward selection signal, shown in FIG. 6C, is also generated during the scan of the sensor 10 through a selected reference quadrant of the scanning sensor 10. This signal is conjuncted with one or the other of the pattern pulses R and S to determine the forward or reverse direction of movement of the tracer. These signals shown in FIGS. 6A, 6B and 6C, thus define the actual pattern angle alpha prime, or A', as detected.

As will be explained hereafter, an important aspect of the present invention is that the Control Angle Generator 34 functions to generate a control angle beta, or B, which selectively differs from the detected pattern angle alpha, to establish an effective forward offset that optimizes the pattern tracing for different tracer speeds. The determination of the control angle beta is based on the actual pattern angle alpha, as detected.

Hereafter, for purposes of simplicity of description, it shall be assumed that pattern angle alpha and actual pattern angle alpha prime are equivalent and the true pattern line is line 24 of FIG. 5. With this understanding the pattern angle alpha is the angle which a line drawn between the tracing element O and the forward one of two intersections S and R of the pattern line 24 with the periphery of the sensor makes with the X-axis, as seen in FIG. 5. When the sensor is located solely on a straight line segment, such as segment AC (FIG. 7), then the angle alpha, as detected, is the actual pattern angle. When the sensor partly overlies each of two intersecting straight line segments, such as segments AC and CD, then the angle alpha, as detected, comprises an angle having a value which lies between the angle of segment AC and the angle of segment CD relative to the X-axis. When the sensor is on a curve, the angle alpha, is the angle formed by the X axis and the line determined by the center of the sensor, or tracing element O, and the selected intersection S or R of the sensor periphery with the given curve. As will be described with reference to FIG. 14, a turn in the pattern formed at the intersection of two line segments is distinguished from a smooth curve for purposes of controlling the movement of the tracing element accordingly.

In conventional tracers, the detected pattern angle alpha from generator 42 would be applied directly to the Beta to XY Converter 29. The Sensor 10, the X-Axis Drive Circuit 12, the Y-Axis Drive Circuit 14, the Beta to XY Converter 29, the Speed Control Circuit 36, the Pattern Angle Generator 42, the Angle Adder Circuit 50, the Kerf Angle Control Circuit 54 and the Sensor Circuit 46 may all be of conventional designs which are well known to those skilled in the art of pattern tracers. The particular details of these functional blocks do not form a part of the present invention, and reference may be made to the patents noted above for further details. Accordingly they are not described further.

Figure 10:
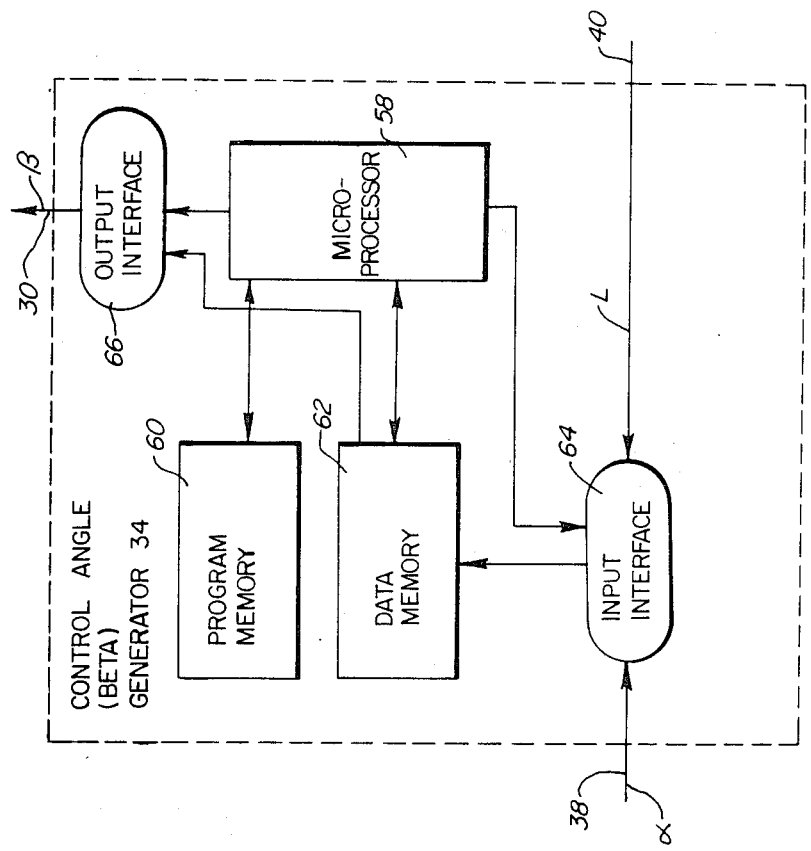
FIG. 10 is a functional block diagram of the Control Angle Generator of FIG. 4.

The Control Angle Generator 34, on the other hand, is unique to this invention. The implementation of a circuit capable of performing the operations of the Control Angle Generator 34 described below can be achieved in numerous ways. The circuit details of this implementation form no part of the invention and accordingly only the function and technique is described further. The Control Angle Generator 34 comprises a computer or a logic circuit for determination of the control angle to be generated and applied to input 30 of the Beta to XY Converter 29 and electronic interface circuitry for compatable interconnections with the other circuitry. Referring to FIG. 10, a preferred embodiment of the Control Angle Generator 34 is seen to comprise a Microprocessor 58, a Program Memory 60, such as a ROM and a Data Memory 62, such as a RAM. An Input Interface 64 provides pattern angle information from the Pattern Angle Generator 42 and speed control information from the speed control circuit 36 to the Data Memory 62, and an Output Interface 66 provides control angle information to the Beta to XY Converter 29. The computer, microprocessor or other logic circuit produces control angles based upon the speed and detected pattern angle information applied to its inputs 38 and 40 in accordance with the programs contained in program memory 60, the algorithms of which are shown in FIGS. 12A, B and C; 13A, B and C and 14A, B and C.

The function of the control angle generator 34 is to provide control angle signals to the Beta to XY Generator 29, so that the tracer functions as if it had an effective forward offset $R_e$ that differs from the actual offset R and which results in an optimal tracing of the pattern. The optimal effective forward offset $R_e$ for a given speed or pattern is determined experimentally by selecting different effective forward offsets $R_e$, tracing the pattern, and then comparing the results. Generally, the relationship between the actual offset R and the effective offset $R_e$ is expressed by the equation:

$$R_e = mR$$

where m is a number between zero and one. In practice m is selected in accordance with both the value of R and the tracer speed.

Two different techniques or methods of operation are provided for the control angle generator 34. One of these methods is referred to as the "save" method. In the save method, the periodically generated alpha angles from Pattern Angle Generator 42 are stored during one period and selectively supplied during a later period by the Control Angle Generator 34 as the control angle beta to establish the effective forward offset $R_e$. In the other method, referred to as the "discard" method the Control Angle Generator 34 functions the same as described above with regard to the save method during one period. During a subsequent period, a control angle beta is calculated from the pattern angle alpha provided by the Pattern Angle Generator 42 and generated by the Control Angle Generator 34 to establish the selected effective forward offset.

Both of these techniques preferably, but not necessarily, employ means for distinguishing one type of pattern turn from another and then controlling the tracing element differently depending upon the type of pattern turn detected. This pattern distinguishing method and apparatus will be described later with reference to FIGS. 14A, B and C. However, for purposes of simplicity, the save and discard techniques will first be described without reference to this feature of the invention.

Figure 7:
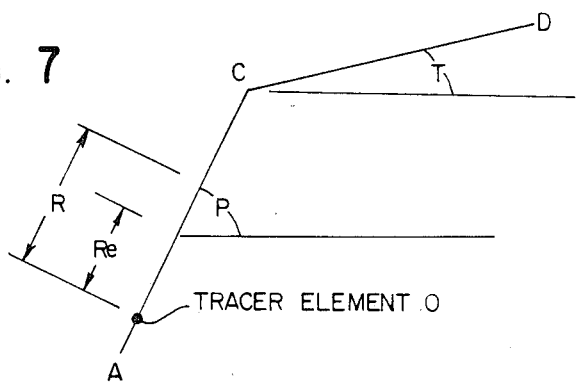
FIG. 7 is an illustration of a typical pattern and showing the relationship between the actual forward offset and the effective forward offset established by the present invention.

The save method will be described first with reference to FIGS. 3, 7, 8, 10, 11 and 12A, B, and C. Referring first to FIG. 7, it is assumed that tracing element O is moving along pattern segment AC at a speed s which is less than the maximum tracer speed. The actual forward offset is R, and it has been determined by experimentation that the best tracing of the pattern is achieved with an effective forward offset $R_e$. The segment AC forms an actual pattern angle P and the pattern segment CD forms a pattern angle T relative to the reference X-axis.

Figure 3:
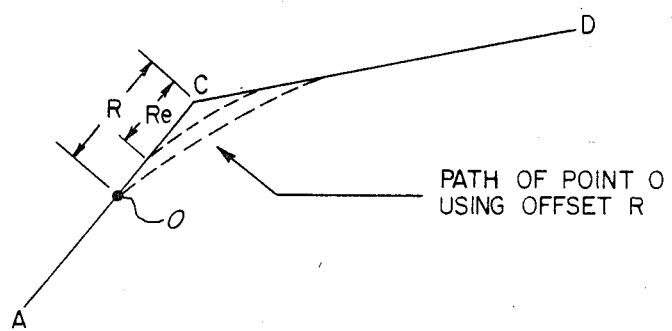
FIG. 3 is a further pattern illustrating the deviation of the tracer path from the pattern resulting from the tracer having a forward offset distance R and referred to in the foregoing background.
Figure 8:
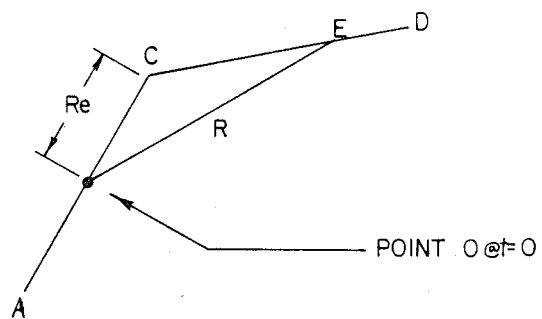
FIG. 8 is another illustration of a pattern and showing the relationship between the actual and forward offsets at a point in time after that illustrated in FIG. 7.

Two reference times are defined, as follows: The time reference $t=0$ is defined as the time when tracing element O is on pattern segment AC and is located at point B at a distance equal to the effective forward offset $R_e$ from the pattern turn at C, as shown in FIG. 8. An earlier time $t=-k$ is defined as the time when tracing element O is on pattern segment AC and spaced from the pattern turn C by the actual offset R, as shown in FIG. 3. Time $-k$ is defined by the equation:

$$t = -k = (R_e - R)/s.$$

Since $R_e$ equals $mR$, then time $-k$ is also defined by the equation:

$$t = -k = -R(1-m)/s.$$

Three different time periods are defined using these time references. The first time period is defined as the time before time equal to $-k$ (i.e. $t < -k$). This is the time period before the pattern turn is detected by Sensor 10. During the first time period, the Pattern Angle Generator 42 produces a detected pattern angle A1 during each scan, or revolution clock cycle. Thus a series of detected pattern angles $A1_1, A1_2, \ldots A1_n$ are generated with each successive angle, $A1_{n+1}$, being equal to the immediately prior angle $A1_n$. Data Memory 62 of the Control Angle Generator 34 temporarily stores angle $A1_n$. The Microprocessor 58 compares the stored angle $A1_n$ to the next generated angle $A1_{n+1}$. So long as the angle $A1_{n+1}$ equals the previously stored detected pattern angle $A1_n$, the Control Angle Generator 34 generates the stored detected pattern angle $A1_{n-7}$ on its output 30. In this event, the tracer operates the same as if the output of the pattern angle generator were coupled directly to the input 30 of the Beta to XY Convertor 29. During the first time period, the tracer functions as if it had an effective forward offset almost equal to the actual forward offset.

The second time period is defined as the time period between the time equal to $-k$ and time equal to zero (i.e. $-k \leq t < 0$). The commencement of this second time period is detected by the control angle generator when its comparator detects that $A1_{n+1}$ does not equal the previous angle $A1_{n+1-S.D.}$ (i.e. $A1_{n+1} \neq A1_{n+1-S.D.}$). When this occurs the generator 34, instead of generating a Control Angle Beta which is equal to $A1_{n+1}$, continues to generate control angles beta which are equal to the previously stored detected pattern angle $A1_n$. The Control Angle Generator 34 continues to generate periodic control angles, or a continuous control angle, which is equal to $A1_n$ until time equals zero, i.e. until the tracing element O is located a distance $R_e$ from the pattern turn, as shown in FIG. 8.

Since the tracer moves at a constant speed, the time between $t=-k$ and $t=0$ is predetermined. The control angle generator 34 includes a counter which commences counting the periodic revolution clock pulses applied to its input or commences counting the pulses of an internal clock at t=−k to determine when t=0. For each speed and effective forward offset, there are a preselected number of pulses after t=−k until time t=0 has been reached. When this preselected number of pulses has been counted, the time t=0 has been reached, and the third time period commences. Until this time the control angle generator functions the same regardless of whether it is operating under the save or the discard method.

The third time period is defined as the time period from t=0 until t=$t_m$. Physically time $t_m$ is defined as the time when the tracing element O has passed the pattern turn at C and begins travelling along pattern segment CD. In both the save and the discard methods, this time is determined when successive detected input angles during the third period are equal to each other and both are equal to the pattern angle T of the pattern segment CD (i.e. when $A3_{n+1}=A3_n$).

When operating under the save method, the Control Angle Generator 34 functions as follows during the third period. When the tracing element is on pattern segment AC and has reached a point at a distance $R_e$ (FIG. 8) from pattern turn C at time t=0, a series of detected pattern angles $A2_n$ will have been stored. These angles will have values which gradually change from a value equal to pattern angle P to a value approaching pattern angle T (FIG. 7). This is because the sensor 10, operating with the actual offset R, has been intersecting pattern segment CD at a series of points associated with the series of angles $A2_n$ from point, or turn C, to point E, as shown in FIG. 8.

Under the save method, at time t=0, the Control Angle Generator 34 starts to selectively read, in the order stored, the stored values of these angles $A2_n$. It then produces control angles beta equal to the selected stored angles $A2_n$.

At time t=0, the relationship between the tracing element O and the pattern 24 is shown in FIG. 8. Because of the generation of control angles beta based upon the detected pattern angle A1n stored during the first period, the tracing element has remained on line segment AC to a distance from the pattern turn at C equal to $R_e$. This is exactly the same position that would have been achieved by a sensor system having an actual offset equal to $R_e$, despite the fact that the actual offset is equal to R. However, during the third time period, the control angles produced by control angle generator 34 will cause the tracing element O to deviate from the pattern and begin rounding the turn at C as if the actual forward offset were the effective forward offset $R_e$, as shown in FIG. 3.

As tracing element O leaves pattern segment AC, a third series of angles are detected as $A3_1, A3_2 \ldots A3_n$ and these angles are also stored in memory of control angle generator 34. When the control angle generator 34 has depleted the stored angles $A2_1, A2_2 \ldots A2_n$, it then reads the third series of stored pattern angles $A3_n$ until tracing element O approaches a position (FIG. 3) on line segment CD at time t=$t_m$. This position reached at time tm, or position m, is recognized by the condition that $A3_n=A3_{n+1}=T$. At that time tracing element O is on segment CD, and operation then continues as described with reference to FIG. 7 until the next pattern turn is detected.

Depending upon the selected speed, the Control Angle Generator 34 stores less than all the detected pattern angles $A2_n$ or selects less than all of the stored pattern angles $A2_n$ for production of corresponding control angles beta. At a tracer speed of fifteen inches, or 38.1 cm., per minute, every fourth pattern angle $A2_n$ is generated as a control angle beta. At a tracer speed of approximately thirty inches or 76.2 cm., per minute, approximately every third pattern angle $A2_n$ is generated as a control angle beta. At a tracer speed of approximately sixty inches, or 152.4 cm., per minute, approximately every second pattern angle $A2_n$ is generated as a control angle beta. Some time after t=0, all the selected $A2_n$ pattern angles have been used, and then all pattern angles A3 are generated as control angles beta at all tracer speeds.

In the save method, the Microprocessor 58 of FIG. 10 preferably operates in accordance with a program stored in program memory 60 pursuant to the algorithms of FIGS. 12A, B and C. These algorithms make shorthand reference to various address generators, a buffer and a scan delay number described below, in the reference to FIG. 11.

Figure 11:
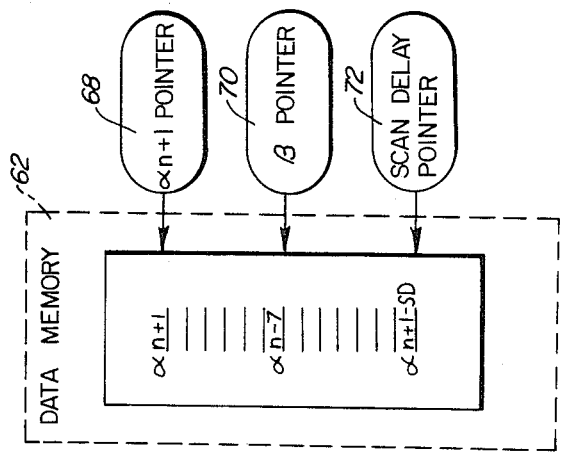
FIG. 11 is a schematic illustration of the data memory and associated address pointers of the Control Angle Generator of FIG. 10.

Referring to FIG. 11, the data memory 62 has a buffer 62 at which are located a number of consecutively numbered storage locations or RAM addresses, at which are stored pattern angles alpha consecutively provided by the input interface 64.

Each stored pattern angle alpha is stored at a location determined by an address generator or $A_{n+1}$ Pointer 68. The address generator 68 produces an address for the location at which the next pattern angle $A_{n+1}$ is to be stored and, in effect, points at this location.

Another address generator, or control angle beta pointer, 70, points to a selected address of buffer 62 at which a previously provided pattern angle alpha has been stored. When such a storage location is pointed at by the control angle beta pointer 70, the previously stored pattern angle alpha is outputted by buffer 62 to the output interface 66 to provide the control angle beta.

A third address generator, or scan delay pointer, 72 points to a storage location of buffer 62 at which is stored a pattern angle alpha during precisely one scan delay prior to that of the new pattern angle $A_{n+1}$ whose storage location is being pointed at by the $A_{n+1}$ Pointer 68. This scan delay, as translated into a storage location, is represented by a scan delay number $N_{SD}$ where $[R(1-m)]/S=(R-R_e/S=N_{SD}(1/F)$ where S equals the linear speed of the tracing element O, m equals the ratio of the effective forward offset to the actual forward offset and F equals the number of complete scanning cycles per second.

In the discard method of this invention, the pattern angles $A2_n$ generated until time t=0 are considered unnecessary and simply discarded. Until that time, the system works identically to that described above in the save system. Instead of using the discarded pattern angles $A2_n$ to generate the control angles beta, the control angle generator 34 calculates the control angle beta based on selected detected pattern angles $A3_n$ as each such detected angle is selected and temporarily stored.

Figure 9:
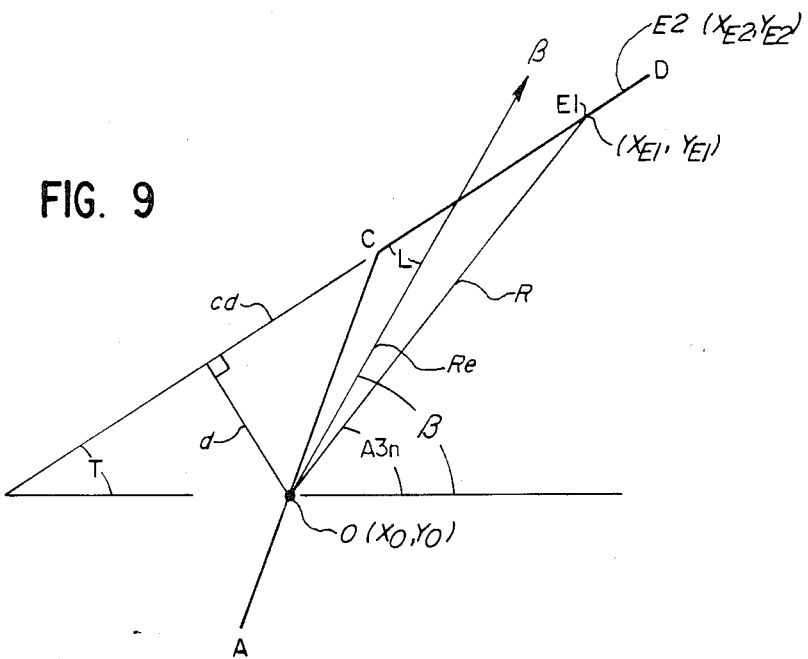
FIG. 9 is another illustration of a pattern and showing the relationships between various angles of the pattern relative to the sensor, the tracing element and the actual and effective forward offsets.

Referring to FIG. 9, the tracing element O leaves the pattern segment AC at time t=0. At any time thereafter, the tracing element O is at a variable distance d from pattern segment CD or the extension cd thereof. This distance d is less than the effective forward offset $R_e$. Further, a line segment of length $R_e$ extending radially in the direction of control angle beta from tracing element O intersects with pattern segment CD to form an angle L. Assuming that pattern segment CD makes an angle T with the X-axis, then the value of output angle beta, or B, must be equal to T plus angle L (i.e. $B = T + L$). Angle T and angle L are calculated by a computer or special digital logic circuit of the control angle generator 34, as described below.

Angle L is determined by the equation $d = R_e \sin L$ and $d = R \sin (A3_n - T)$. This results in the equations $L = \sin^{-1} [\sin (A3_n - T)]/m$ where $A3_n$ is the input angle given by the sensor system at $t > 0$ when the sensing element offset by actual forward offset R intercepts pattern segment CD at point $E_1$ in FIG. 9.

Angle T is determined during the time period from $t = -k$ to $t = 0$ or at any later time interval, as follows. Assuming an offset R, at $t = t_n$, and tracing element O being located at coordinates $(X_0, Y_0)$, then sensor 10 intersects segment CD at E1, at coordinates $(X_{E1}, Y_{E1})$. Then at $t = t_n + \Delta t$ tracing element O is at coordinate $(X_0 + \Delta X, Y_0 + \Delta Y)$ and offset by radial distance R, intersects segment CD at $E_2$ at coordinates $(X_{E2}, Y_{E2})$. The slope of path CD is the tangent of T, i.e.

$$\frac{Y_{E2} - Y_{E1}}{X_{E2} - X_{E1}} = \tan T.$$

Figure 12B:
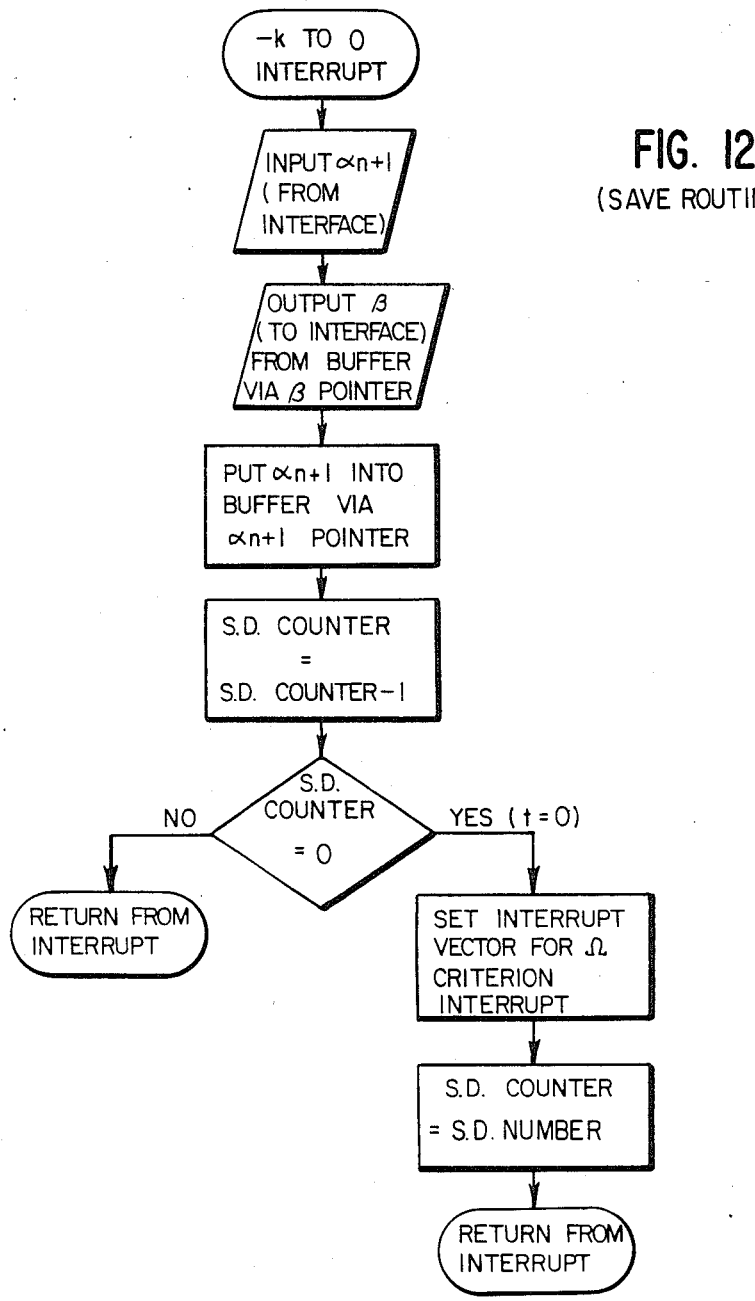
Figure 12C:
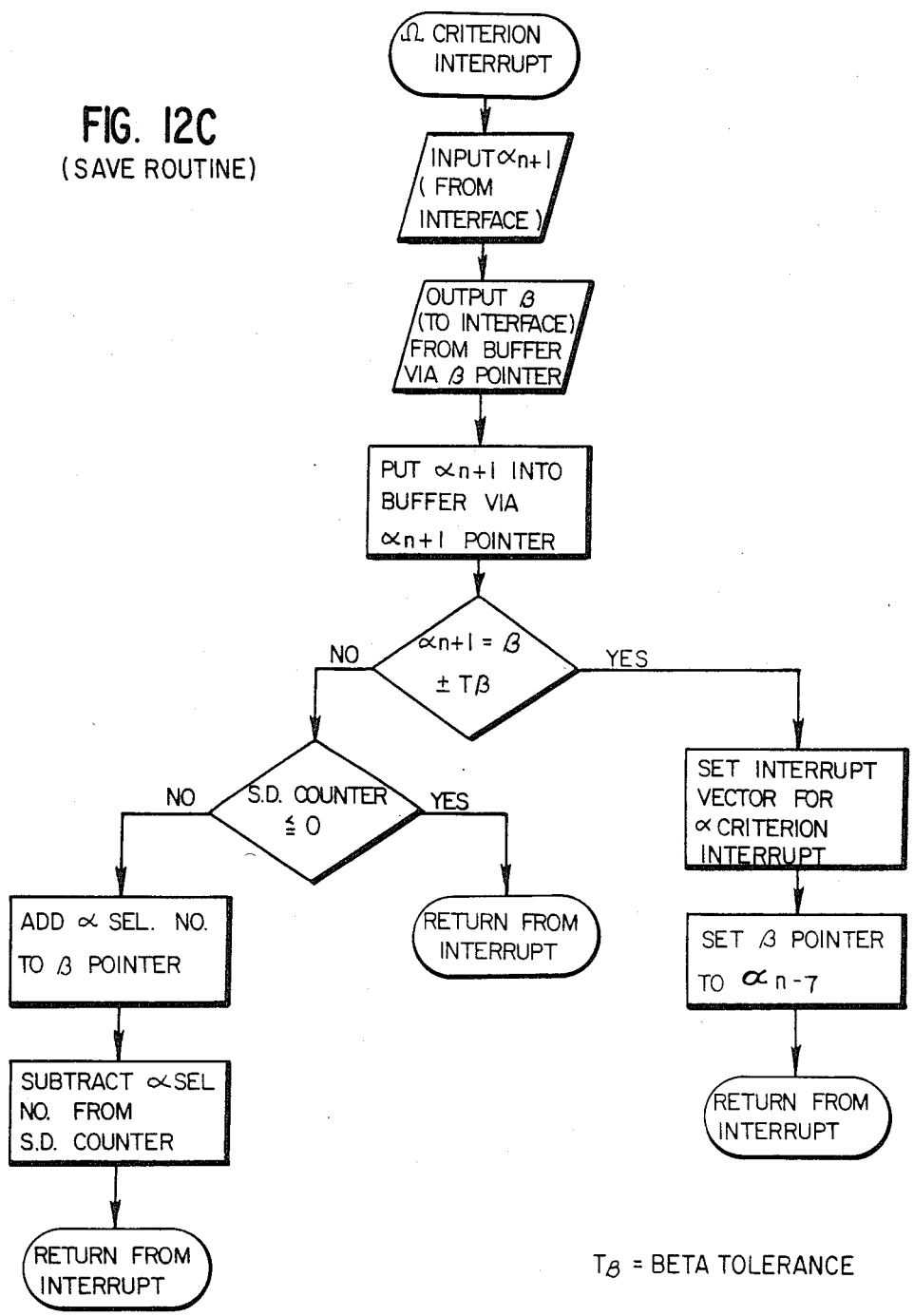
Figure 13B:
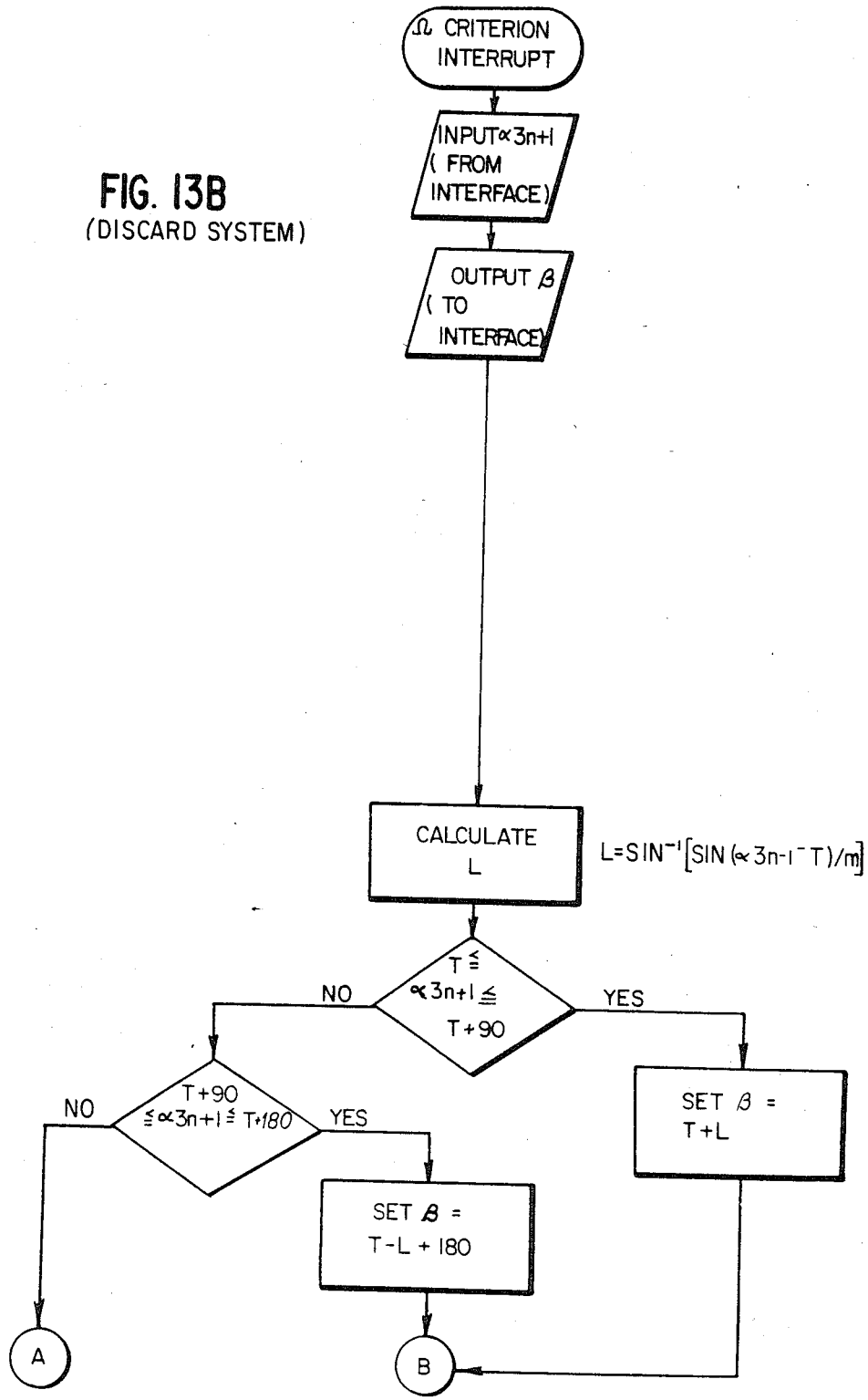
Figure 13C:
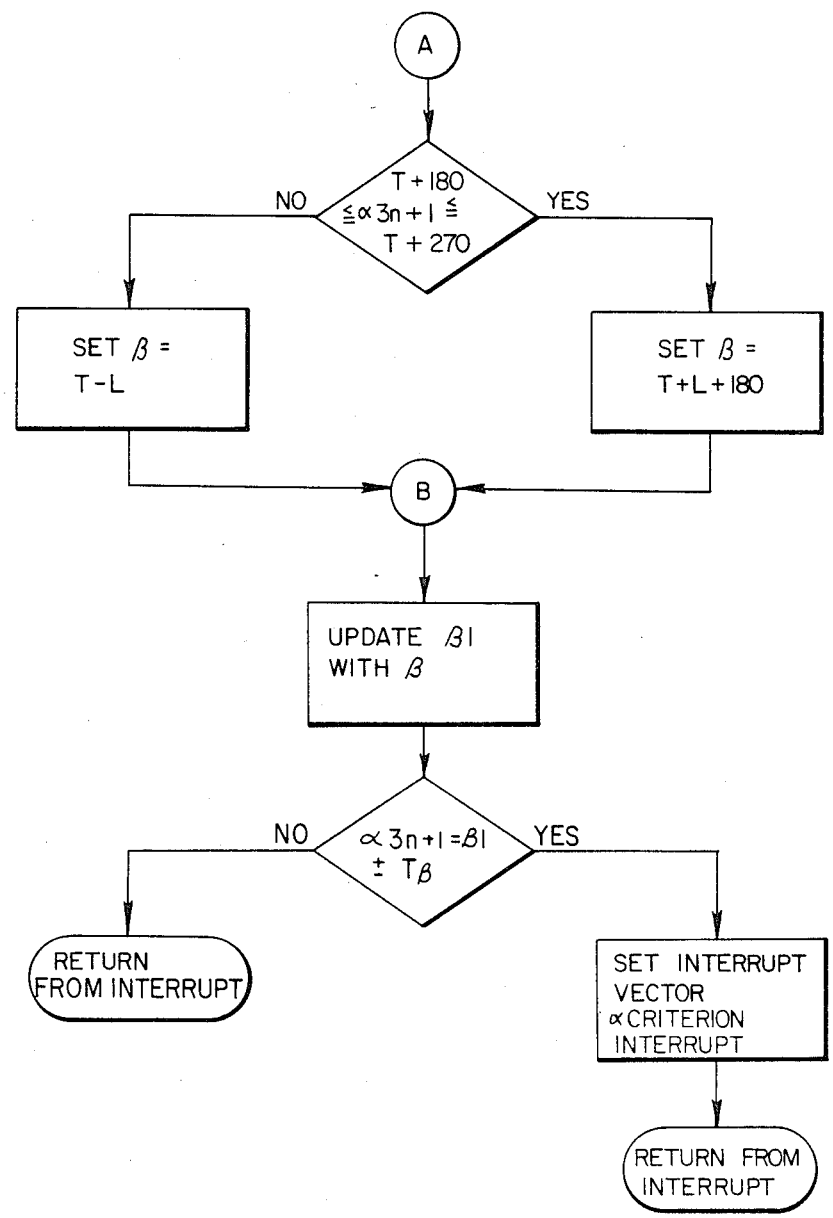

A summary of all the necessary calculations is as follows:

(1) $B = T \pm L \begin{matrix} +180° \\ -0° \end{matrix}$ (2) $L = \sin^{-1} [\sin (A3_n - T)]/m$ (3) $T = \tan^{-1} \frac{R \sin A3_{n2} + s\Delta t \sin B_1 - R \sin A3_{n1}}{R \cos A3_{n2} + s\Delta t \cos B_1 - R \cos A3_{n1}}$ (4) $m = \frac{R_e}{R}$ (5) If  then
    $T \leq A3_n \leq T + 90$    $T + L = B$
    $T + 90 \leq A3_n \leq T + 180$    $T - L + 180 = B$
    $T + 180 \leq A3_n \leq T + 270$    $T + L + 180 = B$
    $T + 270 \leq A3_n \leq T$    $T - L = B$ (6) $0 \leq T \leq 180$ In the discard method, the microprocessor 58 of FIG. 10 preferably operates in accordance with a program stored in program memory 60 pursuant to the algorithms of FIG. 12A and FIGS. 13A, B and C. These algorithms also make shorthand reference of the various address generators, a buffer and a scan delay number described above with reference to FIGS. 10 and 11. The alpha criterion interrupt of FIG. 12A is applied in both the save and the discard techniques with the understanding that the referenced to the "$-k$ to 0 interrupt" is reference to the "discard $-k$ to 0 interrupt" of FIG. 13B. As can be seen from a comparison of FIGS. 12B and 13A, the "save $-k$ to 0 interrupt" and the "discard $-k$ to 0 interrupt" indicate an identical operation until time $t = 0$.

Preferably, in both the save technique and the discard technique, means are provided for distinguishing one type of pattern turn, such as a gradual curve, from another type of pattern turn, such as a point or zero radius turn, and controlling the movement of the tracing element differently in accordance with the different type of pattern turn detected. This is accomplished by the microprocessor 58 by comparing successive pattern angles with a selected criterion of pattern angle changes, as shown in FIGS. 14A and 14B.

An alternative "$-K$ to 0 interrupt" algorithm for the save technique algorithm of FIG. 12B which substitutes the discard technique algorithm of FIG. 13A is shown in FIGS. 14A and 14B for achieving this aspect of the invention.

Figure 14C:
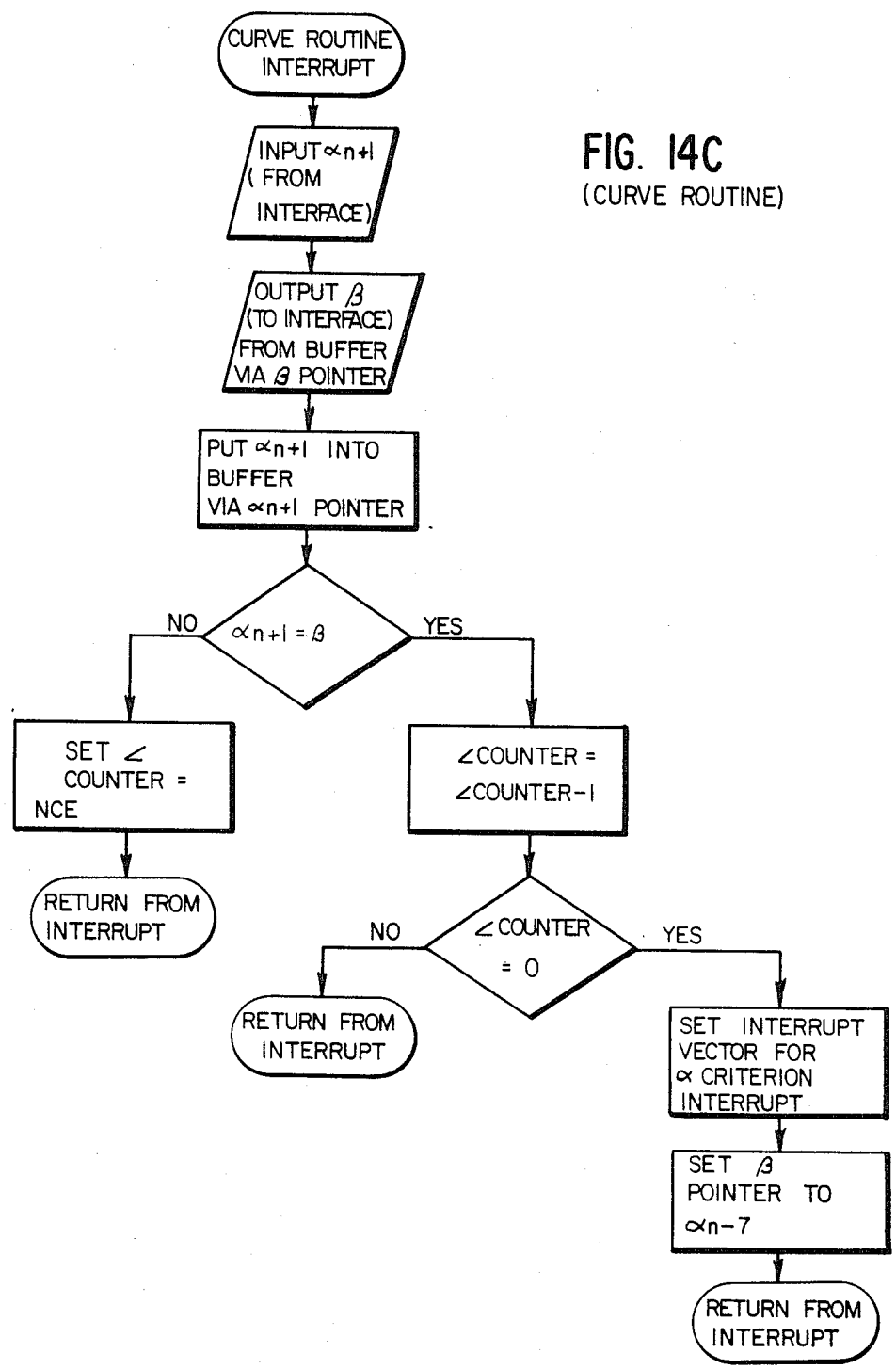

If the pattern angles change rapidly, as they would if a sharp turn were encountered by the sensor, then the gamma test is failed, and the tracing element is controlled as described above. The gamma test is shown in FIG. 14B. Briefly, the gamma test is failed if selected successive pattern angles $A2_n$ indicate that the change in pattern angle is greater than 11°. On the other hand, if the pattern changes are gradual, such that the gamma criteria is met, then the microprocessor 58 operates in accordance with a "curve routine" interrupt, as shown in the algorithm of FIG. 14C. Briefly, during operations in the curve routine, selection of the stored pattern angles alpha for outputting as the control angle beta or for calculation of the control angle beta is shifted backwards by half of the scan delay. This results in a "slower" reaction to the "curve" than would occur for a sharp turn.

The preferred embodiment has been disclosed in detail to illustrate the best mode of practicing the invention, but it should be appreciated that many variations may be made with respect to this best mode which are still included within the scope of the appended claims. For instance, although the invention has been described with reference to a line pattern it could of course be applied to tracing the edge of a solid pattern. Also, although a circular sensor has been illustrated the invention can be practiced with other types of sensors. The sensor could comprise a television camera tube which is scanned at high frequency or a matrix of charge coupled devices or light responsive elements. The sensor could also comprise a single element sensor which is caused to scan in a circular or arcuate path. Further, although particular criteria for control angle selection or calculation have been disclosed, different criteria or methods of calculation could be employed. Also, although only a criterion for distinguishing smooth curves from zero radius turns has been disclosed, it should be appreciated that other criteria for other types of curves are contemplated by this disclosure. These equivalencies and other variations should be obvious to those skilled in the art of pattern tracing.

We claim:

1. A pattern tracer for tracing a pattern at a selected speed with a tracing element, comprising:
   a sensor for detecting a pattern;
   means for storing pattern information from said sensor; and
   means for controlling the movement of the tracing element along the pattern in accordance with portions of said stored information selected on the basis of the selected speed.

2. The pattern tracer of claim 1 in which:
   said sensor has a reference point and means for detecting the pattern at locations spaced from the reference point by a preselected actual forward offset R, and
   said controlling means establishes an effective forward offset $R_e$ base on said stored information and selectively different from said actual forward offset R,
   said controlling means causing the pattern to be traced as if it were being controlled in accordance with information from a sensor having a forward offset substantially equal to said effective forward offset.

3. The pattern tracer of claim 2 in which said controlling means includes means responsive to the speed of the movement of said tracing element for establishing said effective forward offset.

4. The pattern tracer of claim 3 in which said speed responsive means establishes smaller effective forward offsets in response to slower speeds.

5. The pattern tracer of claim 2 in which said effective forward offset is less than said actual forward offset.

6. The pattern tracer of claim 2 in which said controlling means establishes an effective forward offset which is almost equal to the actual forward offset when the reference point is spaced behind a turn in the pattern by a distance greater than the actual forward offset.

7. The pattern tracer of claims 2 or 6 in which said controlling means establishes a selected effective forward offset $R_e$ which is less than the actual forward offset when the reference point is spaced from a turn in the pattern by a distance less than the actual forward offset.

8. The pattern tracer of claim 1 in which said controlling means controls the movement of the sensor in accordance with less than all the stored information.

9. The pattern tracer of claim 8 in which said controlling means includes
means for selecting the speed of movement of the tracing element, and
means responsive to said speed for controlling the movement of the tracing element in accordance with a lesser proportion of stored information at one speed that at a higher speed.

10. The pattern tracer of claim 1 in which
said sensor generates pattern information during perodic scanning cycles, and
said controlling means controls the movement of the tracing element in accordance with pattern information generated during less than all the scanning cycles.

11. The pattern tracer of claim 10 in which
said controlling means includes means for detecting the speed of the tracing element, and
means to control tracing element movement in accordance with less than all the pattern information in response to said detected speed.

12. The pattern tracer of claim 11 in which
the pattern information generated during each scanning cycle is stored, but
said controlling means controls the movement of the sensor in accordance with less than all the stored information.

13. The pattern tracer of claim 1 in which
said sensor has an actual forward offset, and
said controlling means includes means for selecting pattern information stored at one time to control the direction of movement of the sensor at a later time to establish an effective forward offset less than said actual forward offset.

14. The pattern tracer of claim 1 in which said controlling means includes
means for detecting the tracer speed of said sensor, and
means for selecting different portions of stored pattern information in accordance with different detected speeds.

15. The pattern tracer of claims 2 or 13 in which said pattern information storing means includes
means for storing a first set of pattern information during a first period of time that the tracing element is moving toward a pattern turn and is spaced therefrom by an amount less than the actual forward offset but more than the effective forward offset, and
means for storing a second set of pattern information during a second time period immediately following said first time period.

16. The pattern tracer of claim 15 in which said controlling means includes means for controlling the movement of said tracing element during said second time period in accordance with the pattern information stored during the first time period.

17. The pattern tracer of claim 15 in which said controlling means includes means for controlling the movement of said tracing element during said second period in accordance with the second set of information stored during said second period after the first set of pattern information has been used to control the tracing element movement.

18. The pattern tracer of claim 15 in which said first and second sets of pattern information are stored and used sequentially.

19. The pattern tracer of claim 1 in which the pattern defines a pattern angle relative to a reference angle and said sensor detects pattern information representative of said pattern angle.

20. The pattern tracer of claim 19 in which said controlling means includes
means for generating information representative of a control angle which is based on but different from the pattern angle being detected by the sensor, and
means for cntrolling the direction of movement of the tracing element in accordance with said control angle.

21. The tracer of claim 20 in which said pattern information generating means includes means for generating information representative of an effective pattern angle previously sensed by said sensor.

22. The pattern tracer of claim 20 in which said controlling means includes
means for detecting the speed of movement of the tracing element, and
means responsive to said detected speed for generating said control angle.

23. The pattern tracer of claim 1 including means responsive to said stored pattern information for detecting when the direction of the detected pattern is changing.

24. The pattern tracer of claim 23 in which said direction changing detecting means includes
means for detecting an actual pattern angle at one time,
means for detecting an actual pattern angle at another time, and
means for comparing the two actual angles detected at said one and other times to determine if there is a difference between the two detected angles.

25. The pattern tracer of claim 1 including a control angle generator connected with said storing means for determining the time when the tracing element is spaced from a change in pattern direction by a distance equal to an actual forward offset of the sensor.

26. The pattern tracer of claim 25 in which said pattern information storing means includes means for periodically storing the detected angle of a pattern, and said control angle generator includes means for comparing different ones of said detected angles stored during different periods to determine when the direction of the pattern changes.

27. The pattern tracer of claim 25 in which said control angle generator includes means for periodically generating control angles corresponding to a previously stored pattern angle during times when the tracing element is spaced from a pattern turn by an amount less than said actual forward offset and more than an effective forward offset.

28. The pattern tracer of claims 25 and 27 in which said control angle generator includes means for determining when the tracing element is spaced from a pattern turn by an effective forward offset.

29. The pattern tracer of claim 25 and 27 in which said control angle generator includes means for calculating a control angle based on stored pattern angle information and the location of the tracing element relative to the pattern, said movement controlling means controlling the movement of the tracing element in accordance with said control angle.

30. The pattern tracer of claim 29 in which the control angle B is calculated according to the following formula: if $T \leq A3n \leq T+90°$, then $T+L=B$; if $T+90° \leq A3n \leq T+180°$, then $T-L+180°=B$; if $T+180° \leq A3n \leq T+270°$, then $T+L+180°=B$; and if $T+270° \leq A3n \leq T$, then $T-L=B$, where T equals the pattern angle and $L=\sin^{-1} 1/m$ and where m equals a number between zero and one and A3n equals one of a series of stored pattern angles.

31. The pattern tracer of claim 1 in which said controlling means includes
means for determining when the tracing element is at a point in front of a turn in the pattern direction by a preselected distance, and
means for generating a control angle indicating the desired direction of movement of the sensor, said generating means including
means for generating a control angle based on the pattern information stored prior to when said determination is made, and
means for generating a control angle based on a calculation of the actual angle of said turn after the sensor is beyond said point.

32. The pattern tracer of claim 1 in which said control angle equals the actual angle of the pattern plus the angle which a line segment equal in length to an effective forward offset and drawn from the sensor to the pattern makes with the pattern plus 180 degrees.

33. A method of tracing a pattern with a tracing element, comprising the steps of
detecting the pattern direction;
storing the detected pattern direction information during a first time period; and
controlling the movement of the tracing element during a second time period subsequent to said first time period in accordance with the information stored during the first time period, said second time period being sufficiently subsequent to said first period to cause the stored direction information to be significantly different from the pattern direction being detected during the second period.

34. The method of claim 33 including
the step of detecting the speed of the tracing element, and in which
the step of movement controlling includes the step of controlling the movement of the tracing element in accordance with different portions of the stored information associated with different detected speeds.

35. The method of claim 34 in which greater portions of stored information are associated with greater detected speeds.

36. The method of claim 35 in which
said step of detecting includes the step of periodically, photometrically scanning the pattern and generating information representing a series of pattern angles, and
said step of controlling the movement of the tracing element includes
the step of selecting information representing less than all of said pattern angles in accordance with the detected speeds, and
controlling the movement of the tracing element in accordance with information representing less than all of said pattern angles.

37. The method of claim 36 in which information representing all of said series of pattern angles are stored and information representing less than all of the stored angles are selected.

38. The method of claim 36 in which at a tracer speed on the order of sixty inches per minute, the information of approximately every second angle is selected.

39. The method of claim 36 in which at a tracer speed on the order of thirty inches per minute, the information of approximately every third angle is selected.

40. The method of claim 36 in which at a tracer speed on the order of fifteen inches per minute, the information of approximately every fourth angle is selected.

41. An apparatus for tracing a pattern with a tracing element, comprising:
means for detecting the pattern direction;
means for storing the detected pattern direction during a first time period; and
means for controlling the movement of the tracing element during a second time period subsequent to said first time period in accordance with the information stored during the first time period, said second time period being sufficiently subsequent to said first period to cause the stored direction information to be significantly different from the pattern direction being detected during the second period.

42. The apparatus of claim 41 including
means for detecting the speed of the tracing element, and in which
the movement controlling means includes means for controlling the movement of the tracing element in accordance with different portions of the stored information associated with different detected speeds.

43. The method of claim 42 in which greater portions of stored information are associated with greater detected speeds.

44. The apparatus of claim 43 in which said detecting means include
means for periodically, photometrically scanning the pattern and
means for generating information representing a series of pattern angles, and
said controlling means includes
means for selecting less than the information representing all of said pattern angles in accordance with the detected speeds, and means for controlling the movement of the tracing element in accordance with information representing less than all of said pattern angles.

45. The apparatus of claim 44 in which
the information representing all of said series of pattern angles are stored, and
the information representing less than all of the stored angles are selected.

46. The apparatus of claim 44 in which at a tracer speed on the order of sixty inches per minute, the information of approximately every second angle is selected.

47. The apparatus of claim 44 in which at a tracer speed on the order of thirty inches per minute, the information of approximately every third angle is selected.

48. The apparatus of claim 44 in which at a tracer speed on the order of fifteen inches per minute, the information of approximately every fourth angle is selected.

49. A method of tracing a pattern with a tracing element at a selected speed, comprising the steps of:
sensing the pattern to produce pattern information;
storing pattern information from the sensor;
selecting portions of the stored pattern information based upon the selected speed; and
controlling the movement of the tracing element along the pattern in accordance with said selected portions of the stored information.

50. The method of claim 49 including
the step of selecting stored information, and in which said movement is controlled in accordance with the selected information.

51. The method of claim 50 including the step of detecting the tracing element speed, and in which said selection is based at least in part on said detected tracing element speed.

52. The method of claim 49 including the step of calculating a control angle based at least in part on said stored information, and in which
said sensor is controlled in accordance with said calculated control angle.

* * * * *